United States Patent
Kissinger

[19]

[11] Patent Number: 5,949,595
[45] Date of Patent: Sep. 7, 1999

[54] CHILD VIEW SAFETY MIRROR

[76] Inventor: Glen Kissinger, 56 Blemker Rd., Reading, Pa. 19606

[21] Appl. No.: 09/119,525

[22] Filed: Jul. 21, 1998

[51] Int. Cl.[6] .............................. G02B 5/08; G02B 7/182; B60R 1/04
[52] U.S. Cl. .......................... 359/854; 359/865; 359/872
[58] Field of Search .................................... 359/850, 854, 359/855, 862, 864, 865, 866, 872

[56] References Cited

U.S. PATENT DOCUMENTS

| | | | |
|---|---|---|---|
| 896,658 | 8/1908 | McGiehan | 359/854 |
| 2,649,028 | 8/1953 | Lenta | 359/854 |
| 3,009,392 | 11/1961 | Snell | 359/866 |
| 3,485,555 | 12/1969 | Morris | 359/862 |
| 3,667,833 | 6/1972 | Baldwin, Sr. | 359/865 |
| 4,019,812 | 4/1977 | Carnine . | |
| 4,486,075 | 12/1984 | Cohen | 359/865 |
| 4,643,544 | 2/1987 | Loughram . | |
| 4,917,485 | 4/1990 | Baldwin, Sr. | 359/864 |
| 4,927,255 | 5/1990 | Martinez | 359/865 |
| 5,124,847 | 6/1992 | Gong . | |
| 5,165,081 | 11/1992 | Drumheller . | |
| 5,557,467 | 9/1996 | McColgan et al. | 359/864 |

*Primary Examiner*—Ricky D. Shafer
*Attorney, Agent, or Firm*—Terrance L. Siemens

[57] ABSTRACT

A child view safety mirror comprising a main mirror. A structure is provided for mounting the main mirror to a rear surface of a front windshield of a motor vehicle, so that the driver can use the main mirror as a rear view mirror, to look out of the rear windshield of the motor vehicle. A top angled mirror is on the main mirror, so that the driver can use the top angled mirror to view the rear seating area in the motor vehicle, to see children in the rear seats. A left side mirror is provided. A first assembly attaches the left side mirror in an adjustable manner to a left side of the main mirror. A right side mirror is also provided. A second assembly attaches the right side mirror in an adjustable manner to a right side of the main mirror. When the left side mirror and the right side mirror are turned inwardly, the driver can see behind the front seats from one side of the motor vehicle to the other side giving a full view of the entire interior of the motor vehicle. When the left side mirror and the right side mirror are turned outwardly, the blind spot created by conventional rear and side view mirrors is minimized.

8 Claims, 3 Drawing Sheets

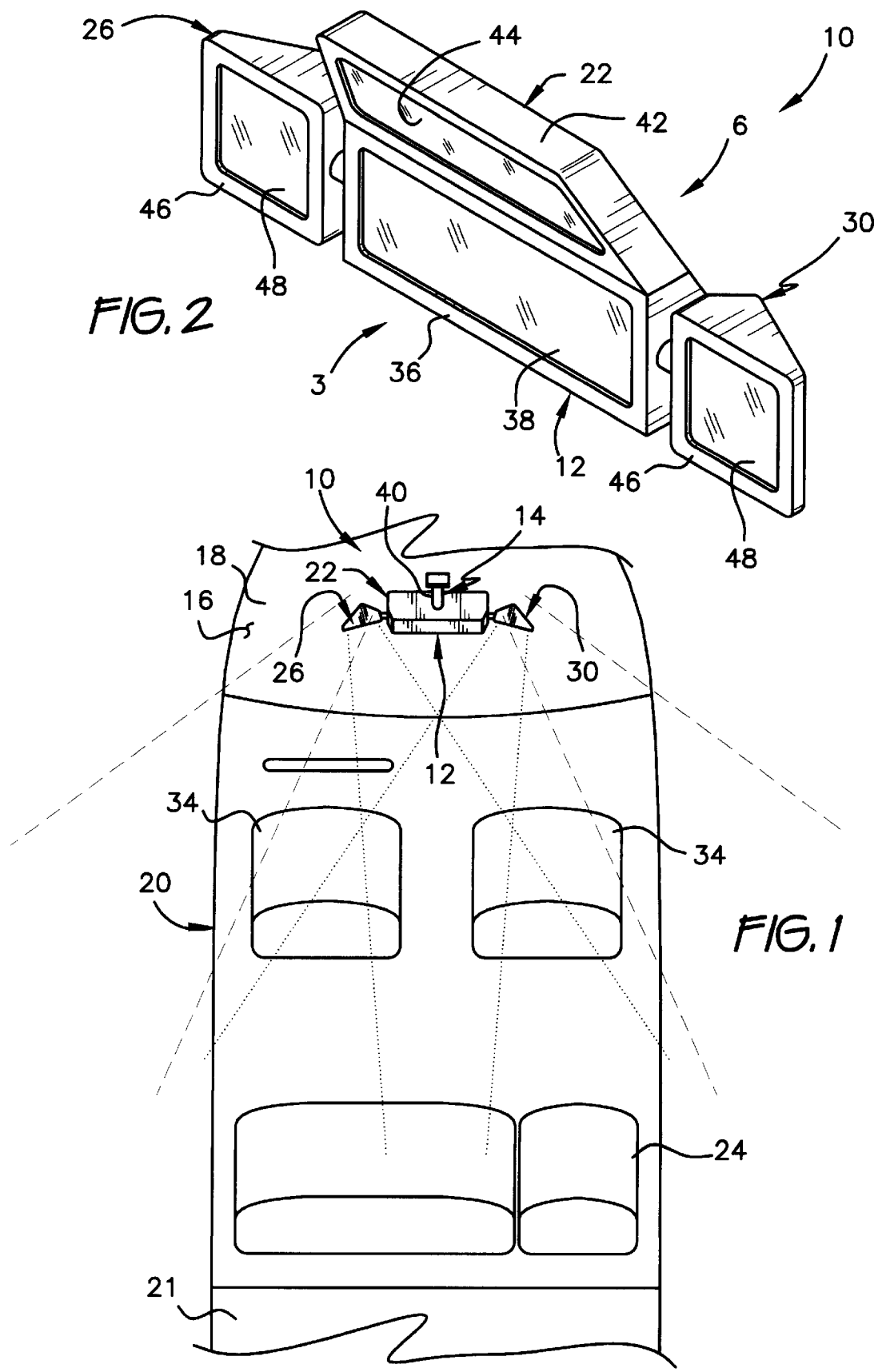

CHILD VIEW SAFETY MIRROR

BACKGROUND OF THE INVENTION

1. Field of the Invention

The present invention relates to automotive mirror accessories which are adapted to be mounted at a front windshield of a motor vehicle, so that the driver can see behind and to opposite sides thereof.

More particularly, the invention comprises a child view safety mirror that replaces a standard rear view mirror in a motor vehicle, so that the driver can now see behind, to opposite sides thereof, as well as to see the rear seating area with children.

2. Description of the Prior Art

Various types of motor vehicles require rear view mirrors mounted to the front windshield, so that the drivers of the motor vehicles can see behind, through the rear windshield while driving. Automotive mirror accessories are shown in U.S. Pat. No. 4,019,812, issued to Elmo Carnine on Apr. 26, 1977, U.S. Pat. No. 4,643,544, issued to William P. Loughram on Feb. 17, 1987, U.S. Pat. No. 5,124,847, issued to Qittua Gong on Jun. 23, 1992 and U.S. Pat. No. 5,165,081, issued to Dennis W. Drumheller on Nov. 17, 1992.

Three of the prior art inventions (U.S. Pat. Nos. 4,019,812, 4,643,544 and 5,165,081), show the automotive mirror accessories mounted to the vehicle's standard rear view mirror. In the fourth (U.S. Pat. No. 5,124,847), the automotive mirror accessory replaces the standard rear view mirror. They all allow the driver to see behind and to see opposite side "blind spots" of the motor vehicles, but there is no structure built into these automotive mirror accessories, to see the rear seating area.

None of the above inventions and patents, taken either singly or in combination, is seen to describe the instant invention as claimed.

SUMMARY OF THE INVENTION

The present invention is a child view safety mirror, which consists of a main mirror to function as the rear view mirror, a top angled mirror used to view the rear seating area and two side mirrors, each pivotally attached on opposite sides on the main mirror to give the driver a full viewing range behind.

Accordingly, it is a principal object of the invention to provide a child view safety mirror that will overcome the shortcomings of the prior art devices.

It is another object of the invention to provide a child view safety mirror that has a main mirror to retain the normal function of the rear view mirror to monitor outside the motor vehicle and operate it safely, while also giving the driver the contentment to monitor the valuable passengers, being children, in the rear seats.

An additional object of the invention is to provide a child view safety mirror that contains ball-joint swivel mirrors on each side of the main mirror, to allow the driver to see behind on both sides of the motor vehicle while driving, thereby eliminating the "blind spots".

A further object of the invention is to provide a child view safety mirror that is simple and easy to use.

A still further object of the invention is to provide a child view safety mirror that is economical in cost to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated of the same becomes better understood when considered in conjunction with the accompanying drawings, in which like reference characters designate the same or similar parts throughout the several views, and wherein:

FIG. 1 is a diagrammatic top plan view of a motor vehicle with the present invention installed in place.

FIG. 2 is a front perspective view of the present invention per se.

DETAILED DESCRIPTION OF THE PREFERRED EMBODIMENTS

Figure 3:
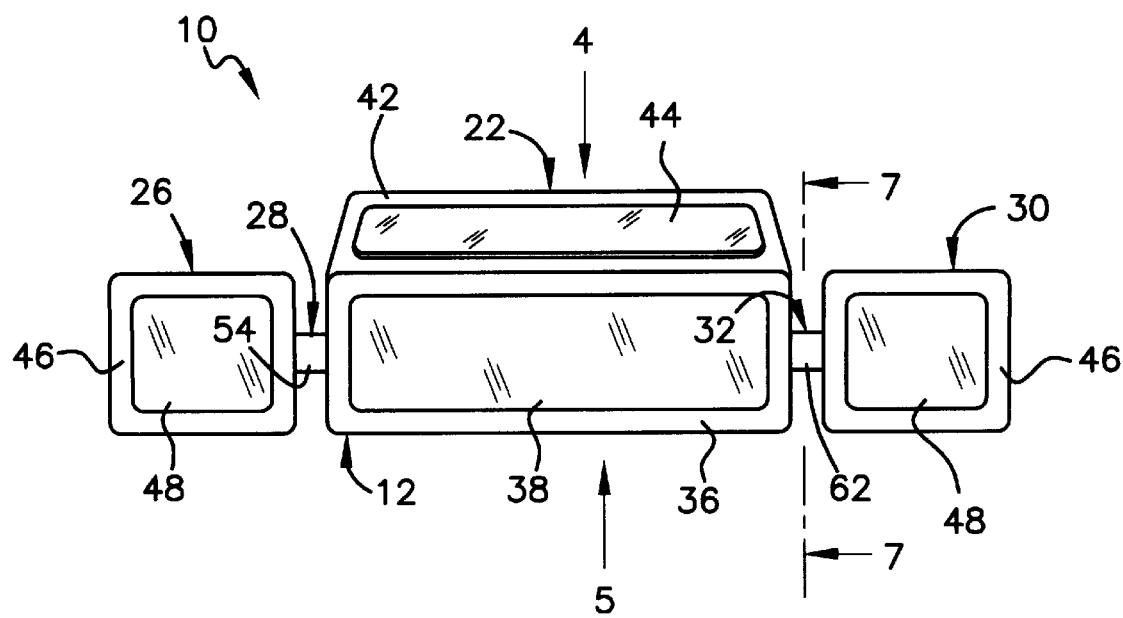
FIG. 3 is a front elevational view taken in the direction of arrow 3 in FIG. 2.
Figure 4:
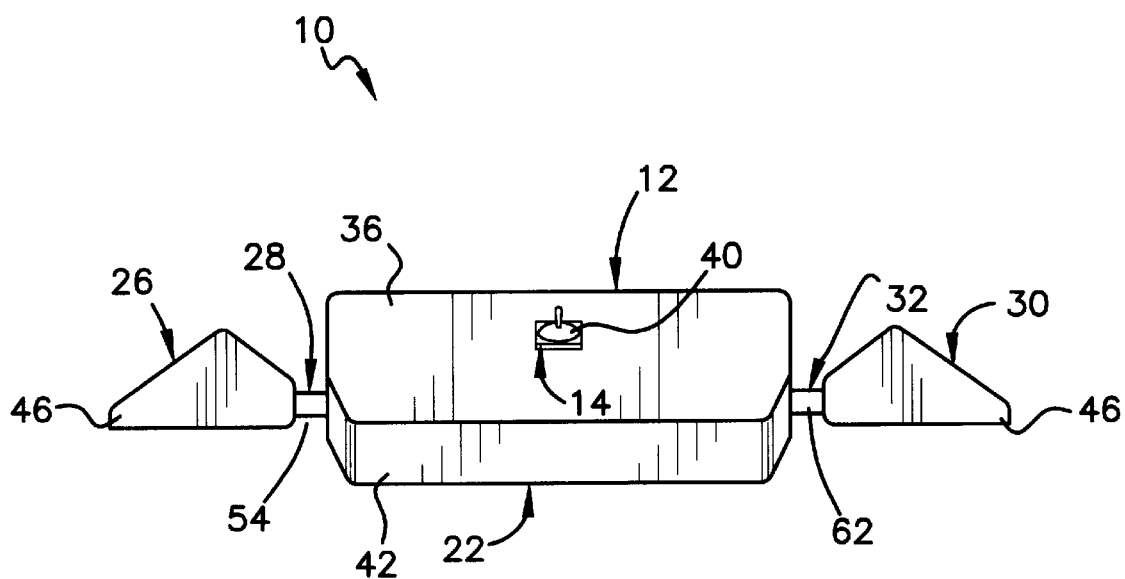
FIG. 4 is a top plan view taken in the direction of arrow 4 in FIG. 3.
Figure 5:
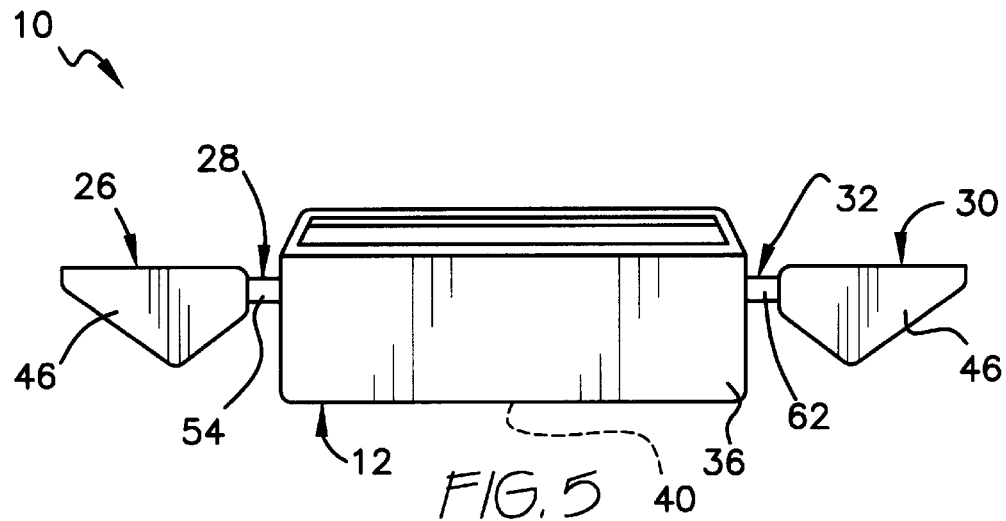
FIG. 5 is a bottom plan view taken in the direction of arrow 5 in FIG. 3.

Turning now descriptively to the drawings, in which similar reference characters denote similar elements throughout the several views, FIGS. 1 through 7 illustrate the present invention being a child view safety mirror 10, comprising a main mirror 12. A structure 14 is for mounting the main mirror 12 to a rear surface 16 of a front windshield 18 of a motor vehicle 20, so that the driver can use the main mirror 12 as a rear view mirror, to look out of the rear windshield 21 of the motor vehicle 20. A top angled mirror 22 is on the main mirror 12, so that the driver can use the top angled mirror 22 to view the rear seating area in the motor vehicle 20, to see children in the rear seats 24. A left side mirror 26 is provided. A first assembly 28 is for attaching the left side mirror 26 in an adjustable manner to a left side of the main mirror 12. A right side mirror 30 is also provided. A second assembly 32 is for attaching the right side mirror 30 in an adjustable manner to a right side of the main mirror 12. When the left side mirror 26 and the right side mirror 30 are turned inwardly, the driver can see behind the front seats 34 from one side of the motor vehicle 20 to the other side, giving a full view of the entire interior of the motor vehicle 20. When the left side mirror 26 and the right side mirror 30 are turned outwardly, the blind spot created by conventional rear and side view mirrors will be minimized.

Main mirror 12 includes a frame housing 36 and a reflective plate 38 affixed into a front surface of the frame housing 36. The mounting structure 14 is an adjustable bracket 40, extending between the rear surface 16 of the front windshield 18 of the motor vehicle 20 and a rear surface of the main mirror 12, so that the main mirror 12 can be angularly adjusted for use by the driver of the motor vehicle 20.

Figure 7:
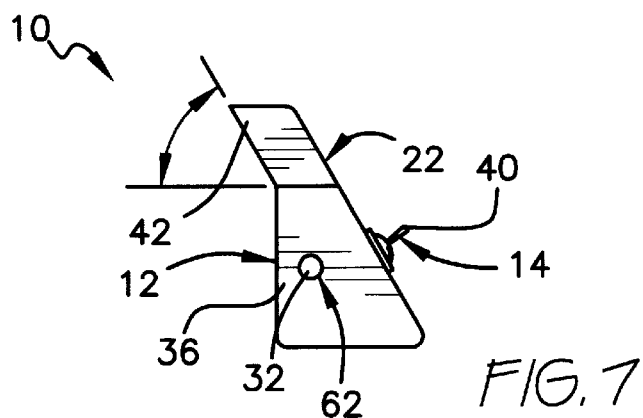
FIG. 7 is a side cross sectional view taken along line 7—7 in FIG. 3.

The top angled mirror 22 consists of a frame housing 42 formed onto the main mirror 12 and set at an angle of about sixty degrees from the horizontal (see FIG. 7). A reflective plate 44 is affixed into a front surface of the frame housing 42. The left side mirror 26 and the right side mirror 30 both include a frame housing 46 and a reflective plate 48 affixed into a front surface of the frame housing.

Figure 6:
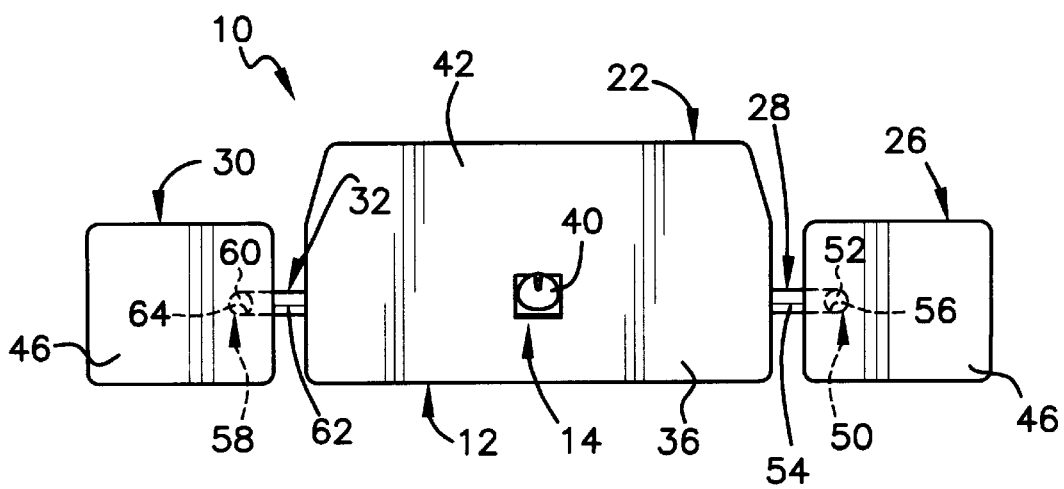
FIG. 6 is a rear elevational view taken in the direction of arrow 6 in FIG. 2.

The first attaching assembly 28, as best seen in FIG. 6, is a ball joint 50 which comprises a ball 52 secured to a stem 54. The stem 54 is affixed to a left side of the main mirror 12. A socket 56 is in a left side of the left side mirror 26, to receive the ball 52. The left side mirror 26 can be freely adjustable both vertically and horizontally. The second assembly 32, as best seen in FIG. 6, is a ball joint 58 which contains a ball 60 secured to a stem 62, with the stem 62 affixed to a right side of the main mirror 12. A socket 64 is in a right side of the right side mirror 30, to receive the ball 60. The right side mirror 30 can be freely adjustable both vertically and horizontally.

Drivers of straight and pick-up trucks having loads can also monitor the loads with the present invention. The child view safety mirror 10 not only retains the normal function of the conventional rear view mirror to monitor outside the motor vehicle 20 and operate it safely, but also gives the driver the contentment to monitor their valuable passengers, children, in the rear of the motor vehicle 20. The child view safety mirror being approximately eight inches wide will not infringe on visibility out of the front windshield 18 for drivers and passengers alike.

It is to be understood that the present invention is not limited to the embodiments described above, but encompasses any and all embodiments within the scope of the following claims.

I claim:

1. A child view safety mirror for a motor vehicle, the motor vehicle including a front windshield with a rear surface, an interior, a rear, a left and right exterior, a front seat, a rear seat and a driver, said child view safety mirror comprising:

a main mirror having a right side and a left side, said main mirror being in a first generally vertical plane;

means for mounting said main mirror to the rear surface of the front windshield, to allow the driver to use said main mirror to see out the rear of the motor vehicle;

a top angled mirror rigidly attached to said main mirror, said top angled mirror being inclined towards the main mirror in a second plane at an obtuse angle to the first generally vertical plane, to thereby allow the driver to use said top angled mirror to see the rear seat of the motor vehicle and any occupants therein;

a left side mirror adjustable attached to said left side of said main mirror; and a right side mirror adjustable attached to said right side of said main mirror; wherein when said left side mirror and said right side mirror are adjusted inwardly, said child view safety mirror provides the driver with a full view of the interior of the vehicle; and when said left side mirror and said right side mirror are adjusted outwardly, said child view safety mirror provides the driver with a full view of the left and right exterior of the vehicle.

2. The child view safety mirror according to claim 1, said child view safety mirror further comprising:

a first ball joint for attaching said left side mirror to said left side of said main mirror;

a second ball joint for attaching said right side mirror to said right side of said main mirror; wherein said first ball joint includes a first ball attached to a first stem, said first stem being attached to said left side of said main mirror, and a first socket formed in a right side of said left side mirror, said first socket receives said first ball to allow said left side mirror to be adjusted both vertically and horizontally; and said second ball joint includes a second ball attached to a second stem, said second stem being attached to said right side of said main mirror, and a second socket formed in a left side of said right side mirror, said second socket receives said second ball to allow said right side mirror to be adjusted both vertically and horizontally.

3. The child view safety mirror according to claim 1, wherein said main mirror, said left side mirror and said right side mirror each comprise:

a frame housing having a front surface; and a reflective plate affixed to said front surface.

4. The child view safety mirror according to claim 1, wherein:

said main mirror includes a rear surface;

said means for mounting comprises an adjustable bracket that extends between the rear surface of the front windshield and said rear surface of said main mirror; and said main mirror can be angularly adjusted by the driver using said adjustable bracket.

5. The child view safety mirror according to claim 1, wherein said top angled mirror comprises:

a frame housing having a front surface and being formed on said main mirror; and a reflective plate affixed to said front surface of said frame housing; wherein said reflective plate is in the second plane; and the second plane is positioned at an angle of about sixty degrees from horizontal.

6. A child view safety mirror for a motor vehicle, the motor vehicle including a front windshield with a rear surface, an interior, a rear, a left and right exterior, a front seat, a rear seat and a driver, said child view safety mirror comprising:

a main mirror having a right side and a left side, said main mirror being in a first generally vertical plane;

means for mounting said main mirror to the rear surface of the front windshield, to allow the driver to use said main mirror to see out the rear of the motor vehicle;

a top angled mirror rigidly attached to said main mirror, said top angled mirror being inclined towards the main mirror in a second plane at an obtuse angle to the first generally vertical plane, to thereby allow the driver to use said top angled mirror to see the rear seat of the motor vehicle and any occupants therein;

a left side mirror adjustable attached to said left side of said main mirror;

a first ball joint for attaching said left side mirror to said left side of said main mirror;

a right side mirror adjustable attached to said right side of said main mirror; and a second ball joint for attaching said right side mirror to said right side of said main mirror; wherein said first ball joint includes a first ball attached to a first stem, said first stem being attached to said left side of said main mirror, and a first socket formed in a right side of said left side mirror, said first socket receives said first ball to allow said left side mirror to be adjusted both vertically and horizontally;

said second ball joint includes a second ball attached to a second stem, said second stem being attached to said right side of said main mirror, and a second socket formed in a left side of said right side mirror, said second socket receives said second ball to allow said right side mirror to be adjusted both vertically and horizontally;

when said left side mirror and said right side mirror are adjusted inwardly, said child view safety mirror provides the driver with a full view of the interior of the vehicle; and when said left side mirror and said right side mirror are adjusted outwardly, said child view safety mirror provides the driver with a full view of the left and right exterior of the vehicle.

7. The child view safety mirror according to claim 6, wherein said top angled mirror comprises:

a frame housing having a front surface and being formed on said main mirror; and a reflective plate affixed to said front surface of said frame housing; wherein said reflective plate is in the second plane; and the second plane is positioned at an angle of about sixty degrees from horizontal.

8. A child view safety mirror for a motor vehicle, the motor vehicle including a front windshield with a rear surface, an interior, a rear, a left and right exterior, a front seat, a rear seat and a driver, said child view safety mirror comprising:

a main mirror having a right side and a left side;

means for mounting said main mirror to the rear surface of the front windshield, to allow the driver to use said main mirror to see out the rear of the motor vehicle;

a top angled mirror rigidly attached to said main mirror, to allow the driver to use said top angled mirror to see the rear seat of the motor vehicle and any occupants therein, said top angled mirror comprising a frame housing having a front surface and being formed on said main mirror and positioned at an angle of about sixty degrees from horizontal and a reflective plate affixed to said front surface of said frame housing;

a left side mirror adjustable attached to said left side of said main mirror; and a right side mirror adjustable attached to said right side of said main mirror; wherein when said left side mirror and said right side mirror are adjusted inwardly, said child view safety mirror provides the driver with a full view of the interior of the vehicle; and when said left side mirror and said right side mirror are adjusted outwardly, said child view safety mirror provides the driver with a full view of the left and right exterior of the vehicle.

* * * * *